April 17, 1934.　　　　J. F. TURNER　　　　1,955,477
WASTE WATER HEAT ECONOMIZER
Filed Oct. 29, 1931　　　5 Sheets-Sheet 1

Fig. 3.

April 17, 1934.                J. F. TURNER                1,955,477
                        WASTE WATER HEAT ECONOMIZER
                        Filed Oct. 29, 1931      5 Sheets-Sheet 5

Inventor
James F. Turner

Patented Apr. 17, 1934

1,955,477

UNITED STATES PATENT OFFICE 1,955,477

WASTE WATER HEAT ECONOMIZER

James F. Turner, Baltimore, Md., assignor to Flynn & Emrich Company, Baltimore, Md., a corporation of Maryland Application October 29, 1931, Serial No. 571,780

17 Claims. (Cl. 257—122)

The present invention relates to a waste water heat reclaimer for laundries and similar plants or industries requiring large quantities of hot water which becomes foul in use and must be discharged, involving a considerable heat loss. The invention provides an apparatus through which the waste water is passed to conserve the heat contained therein before entering the sewer or other corresponding channel by way of which it is finally discarded.

The heat reclaiming or economizing apparatus of the invention comprises a reclaimer pit or equivalent receptacle which, in the preferred form, is divided into two or more sections, and in which respective sections the waste water is circulated, it being passed successively from one to the other. In these sections of the pit are submerged corresponding tube sections through which clear water is circulated, the stages of circulation of the waste water and the stages of circulation of the clean water to be heated comprising two series of stages of circulation oppositely arranged as hereinafter further described.

In accordance with the invention a most perfect counterflow with the incoming clean water always travelling toward the successively hotter zones of the waste water in the apparatus is maintained.

Important novel features of the invention are the circulation of the discarded hot water from which the heat is to be reclaimed in a plurality of stages of circulation at successively lower temperatures in the direction in which the water is progressing and the circulation of the incoming cold water in a plurality of stages at successively higher temperatures in heat exchanging relation with the corresponding stages of the waste water at correspondingly high temperatures, the two series or sets of stages of circulation being oppositely arranged so that the incoming cold water at the lowest temperatures is brought in heat exchanging relation with the discharge water at the lowest temperatures and vice versa, thereby effecting the maximum exchange of heat.

Further novel features relate to the arrangement of the tube sections and headers so as to accumulate the clean water and discharge it into the adjacent tube sections in the direction of circulation, the headers being also so designed as to permit relatively hot waste water to pass directly through the headers by way of separate passages.

The invention also contemplates a manner of connecting the headers whereby the cold water is freely discharged from the header of one tube section to the adjacent header of another tube section without interference with the circulation.

Another feature of the invention is the special flushing device consisting of perforated pipes located immediately adjacent the tube sections and transversely to the tubes which pipes are preferably so arranged that they can be oscillated when desired to spray the entire system of tubes with hot or cold water. By oscillating these tubes it is feasible to spray quickly and to clean thoroughly every tube in the apparatus.

In addition to the foregoing subjects of invention which are respectively regarded as of considerable importance, the invention also relates to the details and features of the apparatus for controlling and directing the circulation, for discharging the scum and for clearing the system of waste materials which may be trapped therein.

In the accompanying drawings I have illustrated an apparatus embodying the features of the invention in the preferred form.

Referring to the drawings by numerals, each of which is used to indicate the same or similar parts in the different figures, the heat reclaiming apparatus as shown comprises a pit or vat 1 which may be of concrete or other suitable material. This pit or vat is shown as divided into two sections 2, 3, by a central wall or partition 4, the two sections or chambers 2, 3, corresponding to the first and second stages of circulation of the waste water or hot water being discarded.

As hereinafter more fully described, the hot waste water is admitted by way of the intake hot water main at 5, Figure 1, from which it enters the first section 2 of the vat. From the section 2 it is permitted to flow or overflow by way of the upright and lateral passage 6, see also Figure 3, into the second section 3 of the vat or pit from which it is discharged by way of the discharge main at 7, Figure 1.

It is understood that a design and type of discharge pipe may be used other than that shown at 7, in that the discharge outlet may be similar in design to that shown as the upright pipe and overflow passage 6, thus enabling the final withdrawal of the waste water from the bottom of the vat, and not from the top as shown in the drawings, thereby carrying off by way of the natural discharge a large amount of the residue that ordinarily would accumulate at or near the bottom of the vat.

Figure 2:
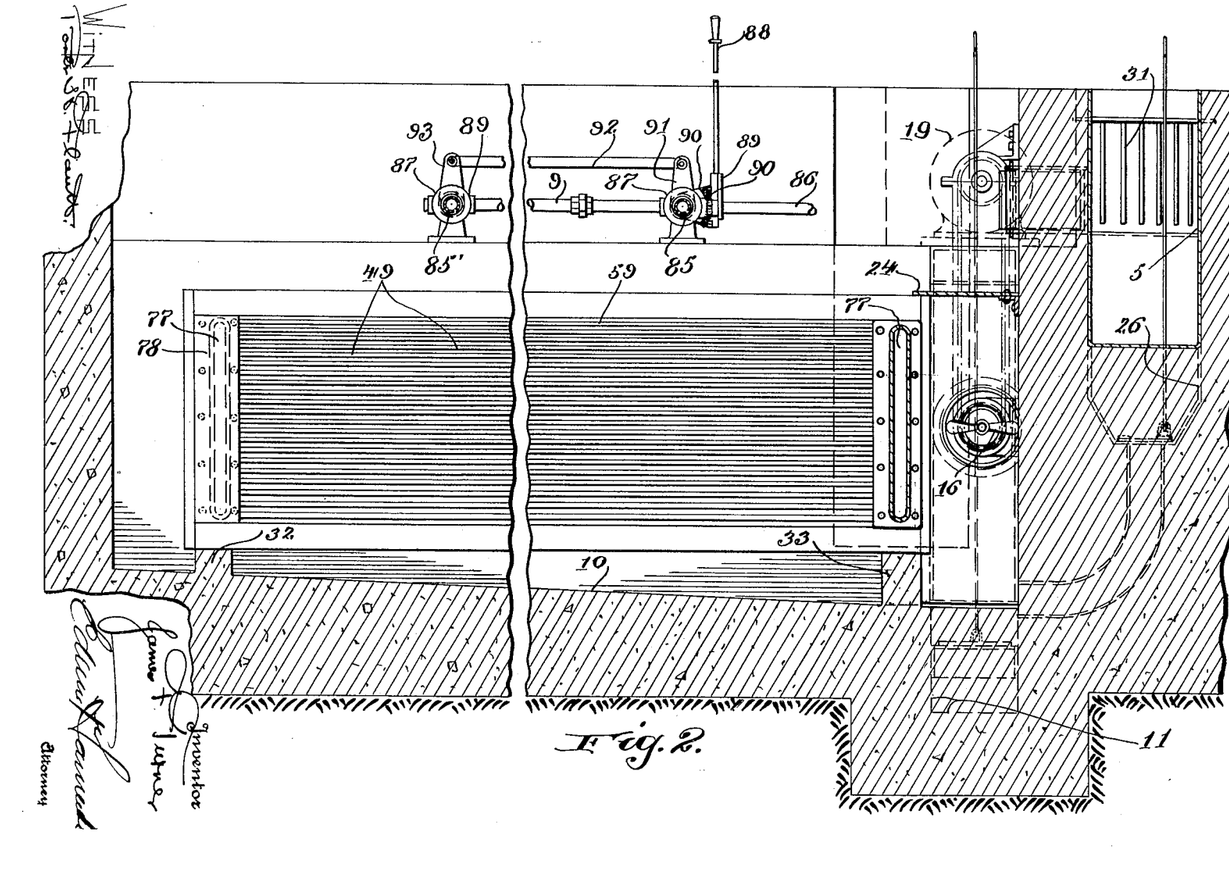
Figure 2 is a section on the line 2, 2 in Figure 1.
Figure 3:
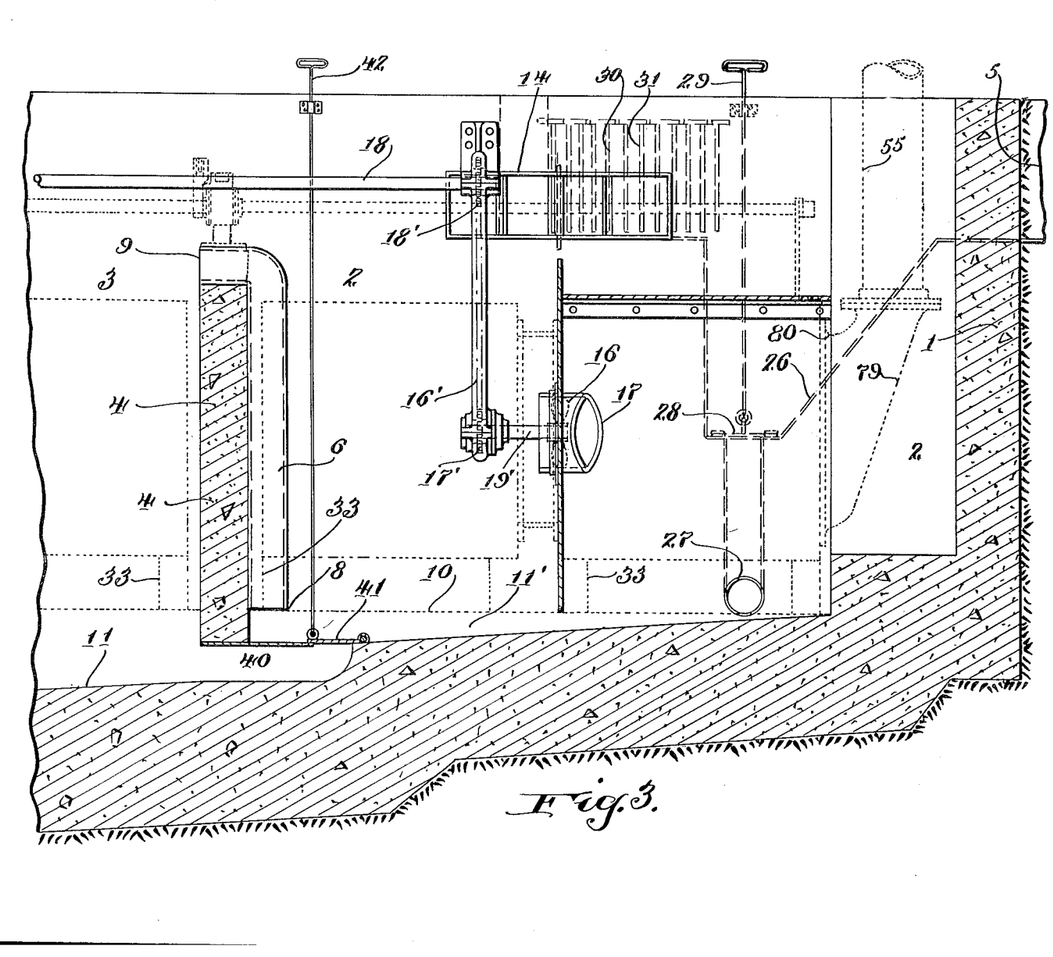
Figure 3 is a section on the line 3, 3 in Figure 1, partially diagrammatic.

It is of interest to note that the overflow passage 6 has its intake end near the bottom of the pit at 8 in Figure 3 and its discharge end at 9 at the level of the top of the partition 4 which as shown is of less height than the walls of the main pit 1. The level of the bottom of the pit is indicated in dotted lines at 10, the section Figures 3 and 4 being taken longitudinally of a gutter or trough 11, shown dotted in cross section in Figure 2, the same extending along the end of the tank between the inlet and the outlet.

Figure 1:
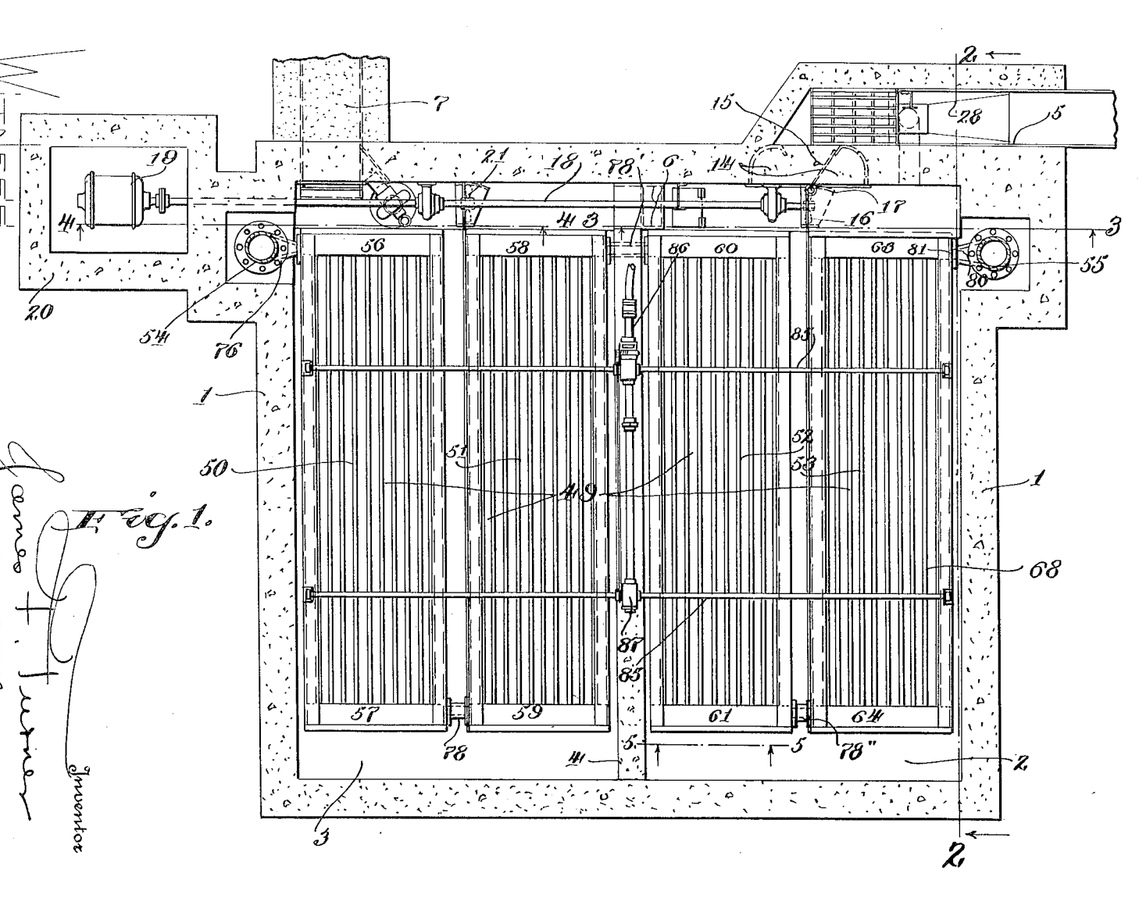
Figure 1 is a plan view of the system.
Figure 4:
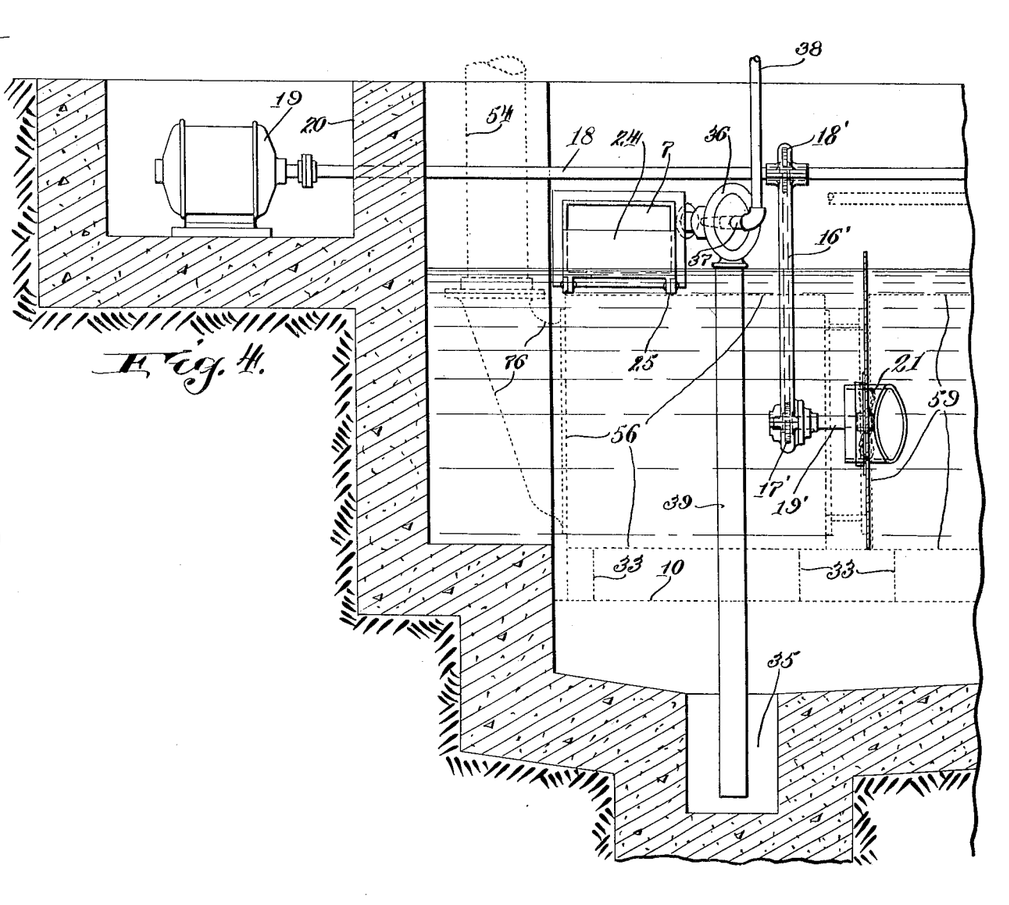
Figure 4 is a section on the line 4, 4 in Figure 1, partially diagrammatic.

It is of interest to note at this time that Figures 3 and 4, while they show in full lines the portion of the construction beyond the section in the direction of the arrows, Figure 1, show diagrammatically in dotted lines the main outline of the structure looking in the opposite direction.

Referring again to Figure 1, the hot waste water supplied by way of the passage 5 enters gate valve passage 14 containing a swinging gate valve 15 by way of which the entering water may be deflected to either side of the passage 14. Directly below and opposite this passage is a propeller or rotary paddle member 16 shown as enclosed by a short tubular guide or flow directing device 17. This propelling paddle 16, which is of the helical type, is operated by a shaft 18, driven by a motor 19 mounted in a suitable pit 20 at the left in Figure 1. It will be noticed, Figure 3, that the propeller paddle 16 is opposite the centre level of the first section 2 of the pit 1, and the shaft 18 operates a second propeller paddle 21, Figure 4, opposite the centre of the second section 3 of the pit 1. The paddle maintains a rapid circulation with the desired amount of turbulence.

In the operation of the apparatus as described, the incoming hot waste water is admitted at the left of the valve 15 as shown in plan in Figure 1, and as it enters it is caught by the suction of the propeller paddle 16 and circulated clockwise about the first section 2 of the tank, and when the tank is supplied with sufficient water, it will begin to overflow by way of the transfer pipe or overflow pipe 6 from the bottom of the first section or chamber 2 to the top of the second section or chamber 3 where it is similarly circulated and on overflowing from the second section 3, it passes out by way of discharge passage 7 to the sewer, it being understood that the overflow from the chamber 2 to the chamber 3 and from the chamber 3 to the discharge takes place continuously in the normal operation of the apparatus. The discharge is controlled by a gate 24, Figure 4, which is pivotally mounted at 25 at the bottom of the opening, and swings toward the tank to open position and oppositely to closed position.

In connection with this gate 24, it is of interest that when during the operation of the apparatus an objectionable scum accumulates so as to interfere with the efficiency of operation, the gate 24 may be closed to raise the level of the water in the pit, after which it is opened causing the water at the surface to rush out into the sewer or other discharge line carrying the scum with it.

The means for disposing of the waste from the hot water is of considerable importance. It will be noted that the intake passage at 5, Figure 3, is trapped at 26, the trap being of large capacity to hold quantities of waste rags, etc., and at the bottom of the trap is a discharge passage 27 leading downwardly to the trough or gutter 11 at the bottom of the tank and at the end remote from the observer in Figure 1. This passage is closed by a flapper valve 28 opening upwardly into the bottom of the trap, and this valve is in turn controlled by a pull rod 29, extending above the top of the pit. The intake passage 5 is also provided immediately adjacent the gate valve passage 14, which admits the hot waste water to the pit 1 and beyond the trap 26 with a grid 30' which as shown consists of depending grid bars 31 spaced apart in the direction of flow and also laterally of the passage 5, see Figure 2. These bars are free at their lower ends so that they project the rags, etc. downwardly.

It will be observed on further examination of Figure 2 that the floor 10 of the pit 1, is inclined downwardly to the right in Figure 2, which corresponds to an inclination downwardly and away from the observer in Figure 1. This inclination has the effect of draining the pit into the gutter or trough 11, the supporting blocks 33 shown in this figure being spaced apart as indicated in Figures 3 and 4, in dotted lines, so that they do not interfere with the flow. The trough 11, see Figures 3 and 4, is inclined downwardly to the left of the observer to a point immediately beneath the discharge passage 7 where the construction shown includes a well 35 from which accumulated waste may be drawn and projected into the discharge passage 7 by means of an ejector 36 operated by nozzle 37, fed by a steam pipe 38 or by any suitable pump. The accumulated waste from the well 35 is carried to the ejector 36 by a waste discharge riser 39.

It will also be noted that the shallow portion of the trough 11 indicated by reference character 11' in Figure 3, which is within the first section 2 of the pit, is connected to the portion of the trough 11 within the second section 3 by a transfer or connecting passage 40 controlled by a flapper or lift valve or guide 41 operated by a pull rod 42 extending upwardly to the top of the tank. It will therefore be easily understood that whenever the pit becomes fouled or for any other reason the operation of the system is stopped for a considerable period, the entire tank may be cleaned and flushed and the trap 26 may be cleaned and flushed at any time by placing the ejector 36 in operation and opening the valve 28 and also the valve 41 when the pit may be completely drained and the accumulated material in the bottom of the tank removed, and the tank and gutter may be further flushed by continuing the supply of water through the inlet 5 or in any suitable manner, as hereinafter further described.

As already stated, the apparatus includes, in addition to the means for introducing circulating and discharging hot waste water, means for introducing clean cold water, circulating it in intimate heat exchanging relation with the hot waste water and carrying it forward and heating it progressively until it is delivered to the locality where it is utilized as clean washing water or for any other purpose, the progress of the clean water being in a general way opposite to that of the hot waste water so that the cold water first introduced comes in contact with the waste water at the lowest temperature, and as the temperature of the cold water rises, it is brought into heat exchanging relation with the waste water at progressively higher temperatures so that the difference in temperature upon which the efficiency of the heat exchange is dependent is maintained at the maximum throughout the progress of the clean water and the waste water through the apparatus. In addition to the means for introducing, circulating and discharging the waste water already pointed out, the apparatus includes a system of tubes 49 for passing the clean water in heating relation with the waste water. This system of tubes may best consist of groups or sections of tubes 50, 51, 52 and 53, numbered in the order in which the clean water to be heated progresses through the system. This clean water is introduced by way of a clean water inlet or feed pipe 54 shown as leading downwardly from above, see diagrammatic illustration Figure 4, and the clean water heated by contact with the hot waste water is discharged from the apparatus or progressed therefrom toward the point at which it is to be utilized by way of a clean water discharge pipe 55.

The groups or sections of tubes are connected at their respective ends by headers 56, 57 at each end of the group 50, 58, 59 at the ends of the group 51, 60, 61 at the ends of group 52 and 63, 64 at the respective ends of the group 53. These headers are of practically identical construction and this construction may be considerably varied within the scope of the invention. One of the headers which may for convenience be considered to be header 57 in Figure 1, is illustrated more in detail in Figures 5 and 6, a portion of the side of the header adjacent the observer being removed to show the internal construction. Each of the headers is shown as in the form of a flat hollow or chambered member which may to advantage be formed of two castings one of said castings indicated by reference character 65 being a rectangular hollow member having sides or edge flanges 66, so that it resembles a shallow pan, and the top side is closed by a flat casting 67 which may be bolted in place as shown, or the header may be constructed in any suitable and convenient manner, the details of construction of the header not being of primary importance in connection with the present invention. The side of the header adjacent the tubes which may be referred to as the bottom of the panlike casting 65, is perforated with a large number of perforations shown in horizontal rows and as of a size corresponding to the tubes 49, which may to advantage be of copper, and the ends of the tubes are inserted in these perforations 69 and secured therein. These tubes 49 preferably terminate at or near the inside surface of the casting. The cover member or flat plate 67 is supported and spaced not only by the side walls or flanges 66, but by spacer bosses 70, or in any suitable manner, the bosses 70 not necessarily being integral with the casting and the castings as shown are secured together by bolts 71 which pass through both castings and through the bosses 70 or through either of the bosses 72 formed on the side walls for this purpose. The tubes 49, as will be further explained, carry the clean water, and provision is made for the passage of the waste water through the headers by way of short tubes 73 of larger cross section than the tubes 49 for the purposes of which tubes 73, both castings 65 and 67, forming the two walls of the header are perforated in alignment at 74 and 75 in parallel lines between the lines of perforation 69, and the respective short tubes 73 are passed through and secured each in two of the registering perforations. Each tube preferably terminates at or near both outside surfaces of the header at its respective ends.

Figure 5:
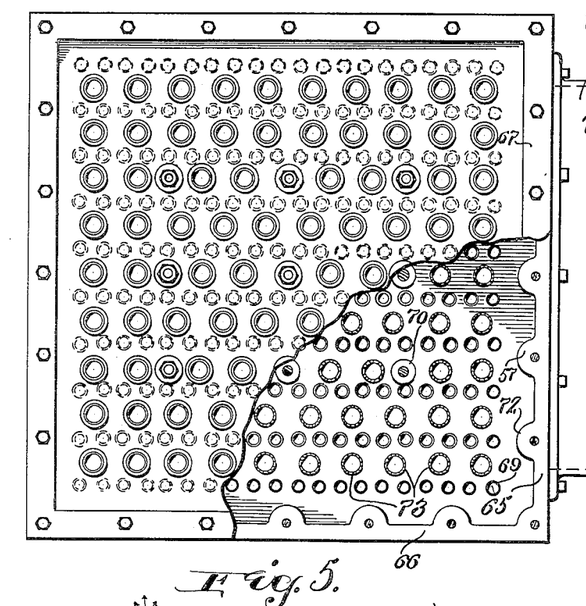
Figure 5 is an enlarged elevation of a tube section taken on the line 5, 5 in Figure 1, portions being broken away to show the internal construction.
Figure 6:
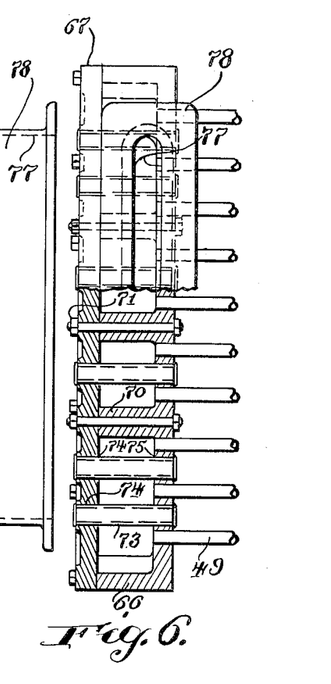
Figure 6 is a side elevation of the same looking from the right also partly broken away.

The header 56, Figure 4, is shown as connected to the intake pipe 54 by an elongated fitting 76, for which purpose the header 56, indicated in dotted lines diagrammatically in Figure 4, is slotted at the corresponding side throughout its vertical length providing for the admission of water along the entire side of the header, and in fact, each of the headers is slotted at one side substantially throughout its length and provided with a connecting fitting, the slot being indicated at 77 in Figures 6 and 2, and the corresponding fitting by reference character 78 in Figures 5 and 6. The fitting 78 is shown connecting the headers 57 and 59 in Figure 1, and a similar fitting 78' connects the headers 58 and 60 in the same figure, and a similar fitting 78'' connects the headers 61 and 64. The discharge pipe 55, see Figures 1 and 3, is arranged and connected in a manner similar to the connection of the intake pipe 54 by means of a fitting 79 having an elongated connection 80, Figures 1 and 3, with the header 63 which in the preferred form is slotted vertically throughout its entire length at 81. In operation the waste water circulates in the direction of the arrows 95 and the clean water in the direction of the arrows 96, Figure 7.

It will be understood that the cold water being admitted by way of the pipe 54 accumulates in the header 56 and distributes itself throughout the header passing from this header by way of the tubes 49 of the group 50 to the header 57 wherein it is again accumulated and distributed and mixed, passing thence through the elongated slotted fitting 78 to the header 59 in which it is accumulated. From this header it passes through the tubes of the group 50 to the header 58 from which it passes by way of the elongated slotted fitting 78' to the header 60, in which it is circulated and accumulated, passing by way of the tubes 49 of the group 52 to the header 61 from which header, after being duly accumulated therein it passes by way of the fitting 78'' to the header 64. From this header it passes by way of the tubes 68 of the group 53 to the header 63 from which it passes by way of the slotted fitting 81 to the discharge pipe 55 and to the point at which it is utilized.

It will be understood that at the same time the hot waste water, as it is circulated clockwise in the section 2 of the pit or vat passes toward the observer part of it through the tubes 73, see Figure 6 of the header 63, and part of it over or under the header, from which point it passes rapidly and with much turbulence along the length of the tubes 49, forming the group 53 and hence through the short tubes 73 of the header 64, and part of it over and under the header, through all of which period it is in heat exchanging relation first with the clean water in header 63, then with that in the group of tubes 53 and next with the clean water in the header 64. From this point continuing its clockwise circulation, it passes back part of it through the tubes 73 of the header 61 in heat exchanging relation with the clean water in the header, after which it passes along the clean water tubes of the group 52, part of it going through the header 60, and in each instance part of it going under and over the header as will be observed by examination of Figures 3 and 4, which show the headers spaced upwardly from the floor of the pit being supported on blocks 33. From this point the waste water overflows as through the pipe 6, Figures 1 and 3, into the second section 3 of the vat or pit 1, in which section it is circulated by the paddle 21, as previously described in connection with the first section of the vat or pit in which the water is circulated by the paddle 16. The water is passed through, over and around the header 58, then along the pipes of the group 51 through and around the header 59, then backward through and around the header 57 and then along and in contact with the pipes 49 after which it passes through and around the header 56, from which point it overflows through and by way of the gate 24 to opening or outlet passage 7 in Figure 4 to the sewer or other point of discharge. It will be understood and appreciated, as already pointed out, that in this way the water to be heated is brought in heat exchanging relation with the waste water at the maximum differences of temperature which can be maintained throughout the passage of the water through the apparatus. In this way the most efficient and complete exchange of heat from the hot to the cold water is attained.

Figure 7:
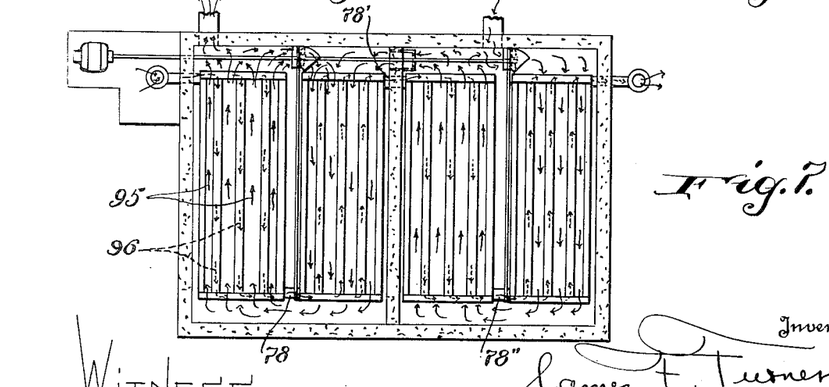
Figure 7 is a diagrammatic plan of the system.

Referring particularly to the diagrammatic illustration of the system as shown in Figure 7, and also Figure 1 of the drawings, it should be understood and readily seen that the operation of the system is not dependent on the flow of the incoming hot waste water which is not at all times continuous, as the hot waste water is only introduced to the system upon its becoming too dirty for further usefulness in the laundry plant for ordinary washing purposes. Of course, if the laundry plant should be sufficiently large, it would be possible to have what might be considered a continuous flow of hot waste water into the waste water heat economizer system. However, it should be understood that the system is not operative only during the time of the flow of the incoming hot waste water, but that the operation of the system is continuous at all times regardless of the periods of flow of the incoming hot waste water in that the propelling paddles 16 and 21 are always operating regardless of the periods of flow of the incoming hot waste water, thus causing the waste water within the vats to circulate over and over again within their respective sections, thereby deriving the maximum amount of heat from the hot waste water remaining therein for purposes of transferring the heat from the same to the clean water entering and passing through the system.

The gate 15 has been shown and described in the position in which it deflects the incoming water toward the rear of the propeller paddle 16 so that it is projected to the right of the observer through the section of tubes 53. If for any reason the motor 19 is not in operation, the apparatus may be operated by swinging the gate 15 to the left hand position in which it is shown in dotted lines causing the incoming water to flow directly along the tubes of the group 53 and backwardly along the tubes of group 52, following the same general path that it follows when moved by the paddle 16.

The manner of removing the scum by raising the water level by closing the gate 24 and then opening this gate to cause an outward rush of the water carrying the scum with it has been described. Applicant has also described the operation of the gutters 11, 11′ draining into the well 35 whereby the debris is drained into the well 35 and removed by way of the riser 39 and the ejector 36 which discharges into the discharge passage 7.

The discharge passage and gate 24 being near the top of the pit, the emptying of the tank is first accomplished by means of the ejector and the residue which has settled to the bottom of the tank being thus caused to flow by way of the gutter to the well, to be later discharged by the ejector, the bottom of the tank being inclined toward the gutter as already explained, for this purpose.

The grid bars 31 stop the larger debris, causing it to be caught in the trap 26 where it may be retained until the water is being discharged from the tank when the valve 28 is opened, passing it into the gutter, and if desired the flow of water may be kept up when the tank is nearly empty to flush the trap.

It is also of interest that the groups of tubes, 50, 51, 52 and 53, may be completely flushed and cleaned by way of horizontal perforated sprinkler pipes 85, see particularly Figure 1, which extend transversely over the tops of these tubes. These sprinkler pipes are supplied with hot or cold water by way of hot water pipe 86, and they are rotatably mounted at their inner ends in fittings 87. To spray the entire area of the pipe section 50, 51, 52 and 53, these pipes 85, 85′ are so constructed that they may be rocked by the operation of a hand lever 88, the hand lever being connected to rocking toothed segment 89 meshing with segment 90 on a lever 91 which is secured to pipe 85. This lever 91 is connected at its upper end by rod 92 to lever 93 secured to and rocking pipe 85′. It will be understood that by rocking lever 88 transversely to the plan of Figure 2, the pipes 85 and 85′ are rocked to the right and/or left, spraying the entire system of tubes 49.

I have thus described specifically and in detail a heat economizing apparatus for waste water particularly adapted for use in laundries and in other plants where large quantities of hot water are fouled and must be thrown away. The description is stated specifically and in detail as to applicant's preferred apparatus in order that the manner of constructing, operating and using the apparatus of the invention and operating in accordance with the method of the invention may be fully understood. However, the specific terms herein are used descriptively rather than in a limiting sense, the scope of the invention being defined in the claims.

What I claim as new and desire to secure by Letters Patent is:

1. An apparatus for recovering heat from waste water, comprising a vat and a paddle submerged therein, means for operating the paddle to circulate the water in the vat, means for introducing the waste water into the vat and discharging it therefrom, tubes submerged in the vat in the path of circulation and arranged in successive groups of parallel tubes, and means connecting the tubes of each group collectively at their ends and means for introducing clean water into and discharging it from the tubes whereby the clean water is circulated through each group successively, the groups of tubes being arranged in the path of the waste water so that the flow through the tubes takes place oppositely to the flow of the waste water the connecting means being open to provide for the flow of waste water and the paddles serving to circulate the water therethrough and prevent stagnation between the tubes.

2. In an apparatus for recovering heat from waste water, a plurality of vats, means connecting the vats together permitting the water to overflow from one section to the other, means for releasing the water from the vat into which it is thus overflowed, and means for introducing the water into the section from which it is flowed, means for circulating the water in each vat, a set of parallel tubes submerged in each vat in the path of circulation the tubes being disposed in the direction of circulation and the sets being arranged successively in said path, and means connecting the tubes of each set together collectively at their ends to conduct clean water through the vats oppositely to the flow of waste water, said connecting means having passages therethrough for the waste water through which the waste water is forced by the circulating means preventing stagnation of the waste water between the tubes.

3. In an apparatus for recovering heat from waste water, a plurality of vat sections, means connecting the sections together permitting the waste water to overflow from one section to the other, means for releasing the water from the section into which it is thus overflowed, and means for introducing the water into the section from which it is overflowed, a set of tube sections submerged in the vat sections and connected together to conduct clean water through the system oppositely to the flow of waste water, a trough draining the bottom of the vat and connecting the vat sections together, a valve for controlling and permitting the flow through the trough from one section to the other along the bottom of the trough, a well into which the trough is discharged and means for withdrawing the water and waste from the well and discharging it from the apparatus.

4. In a heat economizer for waste water a vat, means for introducing waste water into the vat and circulating it therein, a series of multiple tube sections submerged in the vat, a header at each end of each section and means connecting the headers of different sections together providing for free flow from one section to the other, means for introducing the clean water into one header and discharging it from the header at the other end of the tube sections, the tube sections being arranged and connected to provide for the flow of the clean water oppositely to the circulation of the waste water, the connection between two headers comprising an opening or passage elongated in the direction of the height of the headers to a dimension substantially equal to the entire height of the neighboring headers which are in or substantially in the same plane transverse to the tube.

5. In a heat economizer for waste water a vat, means for introducing waste water into the vat and circulating it therein, a multiple tube section composed of a set of parallel tubes submerged in the vat, a header at each end of the section connecting the adjacent ends of the tube to the section as a whole and means for introducing the clean water into one header and discharging it from the other header, the tube sections being arranged and connected to provide for the flow of the clean water oppositely to the circulation of the waste water, the headers having the clean water tubes connected at one face and openings for the waste water extending through the headers from face to face and means for forcing waste water through the said openings in the headers to circulate the waste water in contact with the clean water tubes and prevent stagnation of the waste water between the tubes of the said section.

6. In a heat reclaiming apparatus for waste water a vat for the waste water divided into sections, means providing for the flowing of the waste water from one section to the next section, power operated means for circulating the waste water in each section, multiple tube sections submerged in the vat sections, means for leading clean water to be heated to one section, means for discharging the heated clean water into another section, and means for connecting the tube sections together whereby the clean water is continuously circulated through the waste water and oppositely to the circulation of the waste water, a header at each end of each tube section and a connection leading from each tube section to another, the connection being of cross section closely approximating the area of the side of the header.

7. In a heat reclaiming apparatus for waste water a vat for the waste water divided into sections, means providing for the flowing of the waste water from one section to the next section, means for circulating the waste water in each section, multiple tube sections submerged in the vat sections in the path of circulation, means for leading clean water to be heated to one section, means for discharging the heated clean water into another section, including means for connecting the tube sections together whereby the clean water is continuously circulated through the waste water and oppositely to the circulation of the waste water, said means comprising headers at the ends of the respective tube sections and connections leading from each tube section to the other, the connections being of cross section closely corresponding to the area of the side of the header, the headers having the clean water tubes connected thereto at the ends and having waste water passages extending therethrough.

8. In a heat economizing apparatus, means for leading the waste water to the vat and discharging it therefrom, means for circulating the waste water through the vat, a multiple tube section leading clean water through the waste water and submerged in the vat in the path of circulation, means for flushing the tubes comprising hot or cold water pipes extending transversely of the tubes, said pipes being perforated, and means for rocking the hot water pipes to wash the entire length of the tubes.

9. In a heat economizing apparatus, means for leading the waste water to the vat and discharging it therefrom, means for circulating the waste water through the vat, multiple tubes leading clean water through the waste water submerged in the vat, means for passing the clean water therethrough, opposite to the circulation of the waste water, the vat having a trough for discharging the waste materials or sediment, the bottom of the vat being inclined downwardly toward the trough, a trap for separating waste materials from the intake and means including a valve connecting the trap to the trough and power operated means for discharging the waste water and sediment from the trough.

10. In an apparatus for economizing heat, a vat for waste water in which the heat is to be recovered, means for dividing the vat into sections, means for introducing waste water into one section, power operated means for circulating the waste water in each section, means providing for the overflow of the water from one section to the other, taking the water from the bottom of one section and discharging it into the next section near the top, a discharge passage and means permitting the water to overflow from the last section into the discharge passage, multiple tube sections submerged in the vat in the path of circulation of the waste water for carrying the clean water in heat exchanging relation with the waste water, and each tube section having a header at each end to which the clean water tubes are connected, the waste water passages extending through the headers, means introducing clean water to one tube section and discharging it from another tube section, and means connecting the tube sections in each vat section together and connecting the tube sections in the respective vat sections together, providing for the circulation through the tube sections in each vat oppositely to the circulation of the waste water therein and for the passing of the waste water from one vat into the other oppositely to the flow of the clean water.

11. In an apparatus for economizing heat, a vat for waste water, means for dividing the vat into sections, means for introducing waste water into one section, power operated means for circulating the waste water in each section, means providing for the flow of the water from one section to the other, a discharge passage and means permitting the water to flow from the last section into the discharge passage, multiple tube sections submerged in the vat in the path of circulation of the waste water for carrying the clean water in heat exchanging relation with the waste water, each tube section having a header at each end to which the clean water tubes are connected, waste water passages extending through the headers, means introducing clean water to one tube section and discharging it from another tube section, and means connecting the tube sections in the respective vat sections together, means providing for the circulation of the waste water in the vats and for the passing of the waste water from one vat section into the other oppositely to the flow of the clean water, means adjacent the intake of the waste water for separating the solid materials therefrom, a trough at the bottom of the vat for collecting solid materials and sediment mixed with the water, and means for discharging the water and solid materials from the trough.

12. In an apparatus for recovering heat from waste water, a vat divided into a plurality of sections, means connecting the sections together permitting the water to overflow from the bottom of one section to the upper portion of other, and means for releasing the water from the section into which it is thus overflowed, means for introducing the water into the section from which it is overflowed, a set of tube sections submerged in the vat sections and connected together to conduct clean water through the vat sections successively, means for circulating water in the vat oppositely to the flow of the clean water.

13. In an apparatus for recovering heat from waste water, a vat divided into a plurality of sections, means connecting the sections together permitting the water to overflow from one section to the other and means for releasing the water from the section into which it is thus overflowed, and means for introducing the water into the section from which it is overflowed, a set of tube sections submerged in the vat and connected together to conduct the clean water through the vat oppositely to the flow of waste water, means in the path of the inflow of waste water in the form of a grid for separating waste materials, a trap adjacent the grid, and means for discharging the trapped materials.

14. In an apparatus for recovering heat from waste water, a vat divided into a plurality of sections, means connecting the sections together permitting the water to overflow from one section to the other and means for releasing the water from the section into which it is thus overflowed, and means for introducing the water into the section from which it is overflowed, a set of tube sections submerged in the vat and connected together to conduct the clean water through the vat oppositely to the flow of waste water, a trough at one side of the vat lower than the vat and means for discharging water and sediment from the trough the portion of the trough opposite one section being lower than the portion opposite the next section in the direction of discharge, the division between the vats being transverse to the trough, a gate for cutting off the flow through the trough from one section to the other to prevent discharge of the waste water through the trough under normal conditions, the opening of the gate serving to discharge the sediment.

15. In an apparatus for recovering heat from waste water, a vat divided into a plurality of sections, means connecting the sections together permitting the water to overflow from one section to the other and means for releasing the water from the section into which it is thus overflowed, and means for introducing the water into the section from which it is overflowed, a set of tube sections submerged in the vat and connected together to conduct the clean water through the vat oppositely to the flow of waste water, a trough at one side of the vat lower than the vat and power means for discharging water and sediment from the trough.

16. In an apparatus for recovering heat from waste water a vat comprising a plurality of sections, a trough connecting the sections together, the trough being depressed below the bottom of the vat, means for feeding the water to one section, means providing for the overflow of the water from the lower part of one section to the upper part of the other, and power operated means in the respective sections for agitating the water therein, and tubular means for carrying clean water through the sections from one to the other oppositely to the flow of the waste water in the troughs.

17. In a waste water heat economizing apparatus, a trough and means for leading the waste water thereto and removing it therefrom, mechanical means for circulating the water in the trough, two sections of tubes for carrying feed water, means for passing the feed water through the sections successively, and means for deflecting the flow of the waste water so that it comes first in contact with one section in one position of said means and first in contact with the other section in the other position of said means.

JAMES F. TURNER.